US010797892B2

(12) United States Patent
George et al.

(10) Patent No.: US 10,797,892 B2
(45) Date of Patent: Oct. 6, 2020

(54) ACCESSING COMPOSITE DATA STRUCTURES IN TIERED STORAGE ACROSS NETWORK NODES

(71) Applicant: Cisco Technology, Inc., San Jose, CA (US)

(72) Inventors: Johnu George, San Jose, CA (US); Amit Kumar Saha, Bangalore (IN); Arun Saha, Fremont, CA (US); Debojyoti Dutta, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 74 days.

(21) Appl. No.: 15/907,018

(22) Filed: Feb. 27, 2018

(65) Prior Publication Data

US 2018/0343131 A1 Nov. 29, 2018

Related U.S. Application Data

(60) Provisional application No. 62/510,666, filed on May 24, 2017.

(51) Int. Cl.
| | |
|---|---|
| *G06F 15/167* | (2006.01) |
| *H04L 12/06* | (2006.01) |
| *G06F 3/06* | (2006.01) |
| *G06F 16/24* | (2019.01) |
| *G06F 12/08* | (2016.01) |

(52) U.S. Cl.
CPC .............. *H04L 12/06* (2013.01); *G06F 3/067* (2013.01); *G06F 3/0611* (2013.01); *G06F 3/0635* (2013.01); *G06F 3/0659* (2013.01); *G06F 3/0679* (2013.01); *G06F 12/08* (2013.01); *G06F 16/24* (2019.01); *G06F 3/064* (2013.01)

(58) Field of Classification Search
CPC ........ H04L 12/06; G06F 16/24; G06F 3/0611; G06F 3/0635; G06F 3/0659; G06F 3/067; G06F 3/0679; G06F 12/08; G06F 3/064
USPC ........................................................ 709/212
See application file for complete search history.

(56) References Cited

U.S. PATENT DOCUMENTS

| | | | |
|---|---|---|---|
| 6,691,101 B2 | 2/2004 | MacNicol et al. |
| 7,480,672 B2 | 1/2009 | Hahn et al. |
| 8,086,755 B2 | 12/2011 | Duffy, IV et al. |
| 8,713,405 B2 | 4/2014 | Healey, Jr. et al. |

(Continued)

OTHER PUBLICATIONS

Astakhov et al., "Lambda Architecture for Batch and RealTime Processing on AWS with Spark Streaming and Spark SQL," Amazon Web Services (AWS), May 2015, pp. 1-12.

*Primary Examiner* — Suraj M Joshi
*Assistant Examiner* — Ayele F Woldemariam
(74) *Attorney, Agent, or Firm* — Polsinelli PC (57) ABSTRACT

Aspects of the disclosed technology relate to ways to determine the optimal storage of data structures across different memory device is associated with physically disparate network nodes. In some aspects, a process of the technology can include steps for receiving a first retrieval request for a first object, searching a local PMEM device for the first object based on the first retrieval request, in response to a failure to find the first object on the local PMEM device, transmitting a second retrieval request to a remote node, wherein the second retrieval request is configured to cause the remote node to retrieve the first object from a remote PMEM device. Systems and machine-readable media are also provided.

17 Claims, 5 Drawing Sheets

(56) References Cited

U.S. PATENT DOCUMENTS

| | | | |
|---|---|---|---|
| 8,990,335 B2 | 3/2015 | Fauser et al. | |
| 9,003,159 B2* | 4/2015 | Deshkar | G06F 12/0246 |
| | | | 707/813 |
| 9,229,810 B2 | 1/2016 | He et al. | |
| 9,244,761 B2 | 1/2016 | Yekhanin et al. | |
| 9,244,776 B2 | 1/2016 | Koza et al. | |
| 9,361,192 B2 | 6/2016 | Smith et al. | |
| 9,374,270 B2 | 6/2016 | Nakil et al. | |
| 9,479,556 B2 | 10/2016 | Voss et al. | |
| 9,483,337 B2 | 11/2016 | Gladwin et al. | |
| 9,558,078 B2 | 1/2017 | Farlee et al. | |
| 9,613,078 B2 | 4/2017 | Vermeulen et al. | |
| 9,794,366 B1* | 10/2017 | Pabon | H04L 67/1097 |
| | | | 709/214 |
| 2002/0103815 A1 | 8/2002 | Duvillier et al. | |
| 2003/0174725 A1 | 9/2003 | Shankar | |
| 2008/0016297 A1* | 1/2008 | Bartley | G06F 12/08 |
| | | | 711/159 |
| 2008/0229010 A1* | 9/2008 | Maeda | G06F 3/0605 |
| | | | 711/113 |
| 2013/0290634 A1* | 10/2013 | Cheng | G06F 12/0802 |
| | | | 711/118 |
| 2015/0142733 A1 | 5/2015 | Shadmon | |
| 2015/0222444 A1 | 8/2015 | Sarkar | |
| 2015/0302058 A1 | 10/2015 | Li et al. | |
| 2016/0119159 A1 | 4/2016 | Zhao et al. | |
| 2016/0239205 A1* | 8/2016 | Rothberg | G06F 3/064 |
| 2016/0335361 A1 | 11/2016 | Teodorescu et al. | |
| 2017/0053132 A1 | 2/2017 | Resch | |
| 2017/0132094 A1* | 5/2017 | Ma | G06F 11/3612 |
| 2018/0314511 A1* | 11/2018 | Butcher | G06F 8/65 |

* cited by examiner

ACCESSING COMPOSITE DATA STRUCTURES IN TIERED STORAGE ACROSS NETWORK NODES

CROSS-REFERENCE TO RELATED APPLICATIONS

This application claims the benefit of U.S. application Ser. No. 62/510,666, filed May 24, 2017, entitled "INTELLIGENT LAYOUT OF COMPOSITE DATA STRUCTURES IN TIERED STORAGE WITH PERSISTENT MEMORY", which is incorporated by reference in its entirety.

BACKGROUND

1. Technical Field

The subject technology relates to the field of computing and in particular, to a network of nodes comprising tiered storage devices with persistent memory structures.

2. Introduction

Persistent memory (PMEM) is a non-volatile, low latency memory. Persistent memory can include flash memory using the Non-volatile Memory Express (NVMe) protocol. Persistent memory (PMEM) can be fast like volatile memory (e.g., dynamic random access memory (DRAM)), but has the benefit of persistent data storage. Additionally, persistent memories are byte addressable and have access speeds close to that of DRAM. However, PMEM is not a pure replacement for DRAM or storage devices like hard disk drives (HDDs) and solid-state drives (SSDs), because it is not as fast as DRAM and cannot scale to the storage sizes provided by HDDs/SSDs.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Overview:

Some of the advantages of persistent memory, such as persistence and byte-addressability, make it an ideal storage-type for retrieval of frequently accessed information. However, persistent memory is relatively expensive compared to slower non-volatile memory types, such as hard disk drives (HDDs). Therefore, it may not be feasible or cost effective, to store all information in persistent memory. It would be desirable to improve memory retrieval by identifying data that should be stored into a specific memory device type based on information use characteristics. Additionally, in distributed network environments, some objects or object fields may be available on persistent memory device/s residing on remote nodes. It would be desirable to provide methods of data retrieval that take advantage of byte-addressability to minimize network data transfers for objects that are requested remotely.

Description:

Aspects of the disclosed technology address the foregoing need by providing systems and methods for retrieving a data object from remote memory (PMEM) devices. In some aspects, object retrieval is requested by a local node from a remote node, after the local node determines that the object cannot be found in local memory, such as in a locally accessible PMEM device. In some aspects, object retrieval is performed by the requesting (local) node using a byte-addressable memory call, such as a Remote Direct Memory Access (RDMA) request. By using byte-addressable requests (e.g., RDMA), network loads can be reduced by avoiding the transfer of unneeded data.

Figure 1:
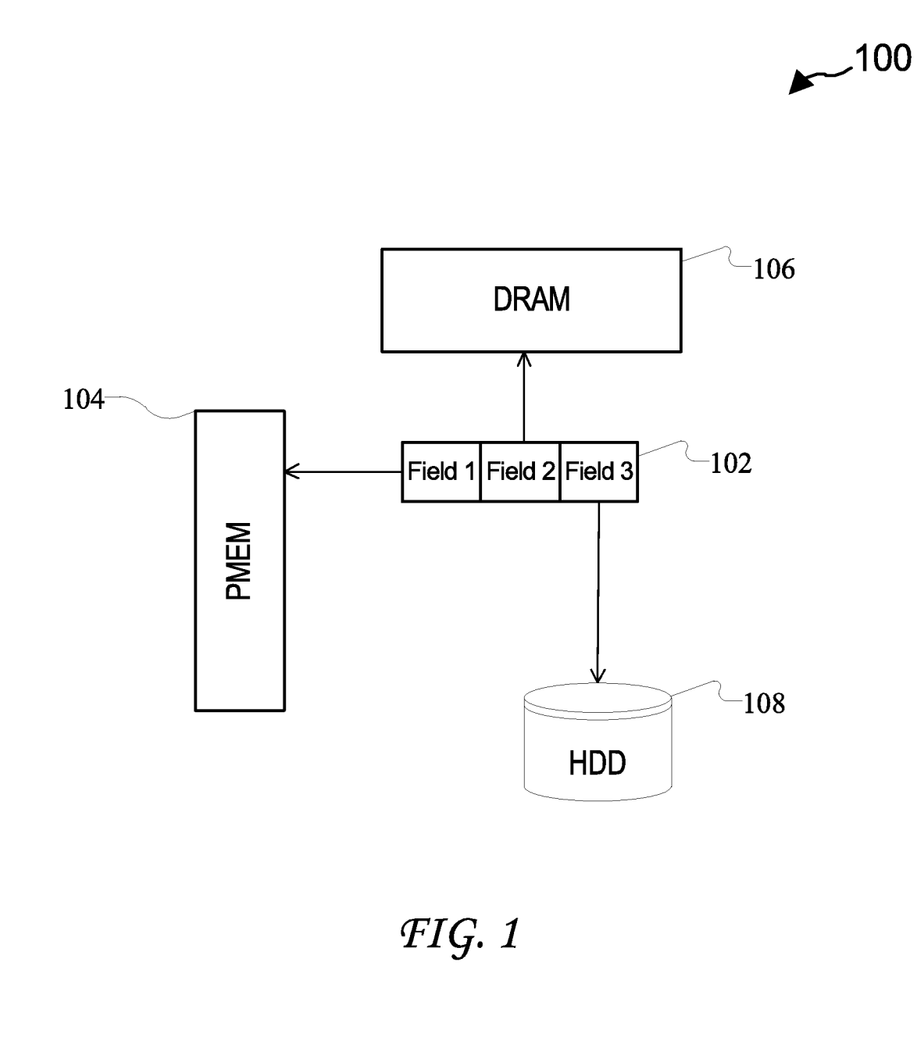
FIG. 1 illustrates an example data structure containing multiple fields that are stored in different memory types in a hierarchical memory structure, according to some aspects of the technology.

FIG. 1 conceptually illustrates an example environment 100, including a data structure (object) 102 that contains multiple fields (e.g., Fields 1, 2, 3) that are stored in separate memory-types in a tiered memory structure. Structure 102 can represent an object, for example, that refers to a particular instance of a class where the object can be a combination of variables, functions, and data structures, e.g., "fields" such as fields 1, 2, and 3.

In the illustrated example, each field of structure 102 is stored into a different memory device-type. For example, Field 1 of object 102 is stored into a persistent memory device (i.e., PMEM 104), Field 2 is stored into a DRAM device (i.e., DRAM 106), and Field 3 is stored into a hard-disk drive (HDD 108). The storage of different object-fields into different memory device types can be handled by a dynamic memory allocator (not illustrated) that is implemented using a combination of software and/or hardware devices. It is understood that additional (or fewer) data structures, fields, and/or storage devices can be used, without departing from the scope of the technology.

The selection of a particular memory-type for storage of a data object at a given node can be based on a cost metric used to evaluate read/write costs for each object of object field. In some aspects, the cost metric can be a function of one or more parameters including, but not limited to: an access frequency of a particular data unit (object or object field), an access cost factor (e.g., a delay incurred when performing read/writes to a particular memory device), a device latency, and/or a re-computation cost factor (e.g., latencies incurred from re-computing data lost due to memory volatility, such as in DRAM). Examples of functions and variables used to compute a cost metric for a given data unit are described in U.S. patent application Ser. No. 15/811,318, entitled "INTELLIGENT LAYOUT OF COMPOSITE DATA STRUCTURES IN TIERED STORAGE," which is incorporated herein by referenced in its entirety.

In some implementations, a total cost of retrieving an object, such as object 102, is a sum of costs associated with each field. Therefore, in the example of FIG. 1, the cost of object 102 could be represented as a cost associated with the retrieval of data from Field 1, Field 2, and Field 3. It is understood that other cost functions may be used to compute a cost for a particular object and/or object-field, without departing from the scope of the technology.

Cost thresholds can be used to determine what objects and/or object fields are stored to a particular memory type. Such determinations can be made on a node-by-node basis, or may be based on the frequency that a particular object/field is requested by other (remote) nodes in a network. On a local node basis, the most costly objects and/or object fields can be stored to PMEM when the associated cost exceeds a first predetermined threshold. Objects and/or object fields may be stored to a DRAM device, for example, when the associated cost exceeds a second predetermined (cost) threshold, but does not exceed the first predetermined threshold i.e., where first predetermined threshold>object cost>second predetermined threshold, then DRAM may be utilized. Further to this example, HDD storage may be used for objects and/or fields that do not exceed the second predetermined (cost) threshold.

Decisions regarding the storage of a particular object or field to PMEM can be based on memory structure size constraints at the local node level, and/or based on memory structure constraints for memory devices associated with a group of geographically remote nodes. In some implementations, memory calls from a remote PMEM device, for example, on a remote network node, may be preferred to retrieving data from a (slower) local memory structure, such as DRAM or HDD. In such instances, the storage of high cost/frequently accessed data objects can be distributed across physically distinct PMEM devices on different nodes. For example, due to space constraints, it may not be possible to store a given (high cost) object or field to a local PMEM device, however, it may be preferential to store the object/field into PMEM at a remote node, as compared to local storage in a slower memory device, e.g., HDD, etc.

Figure 2:
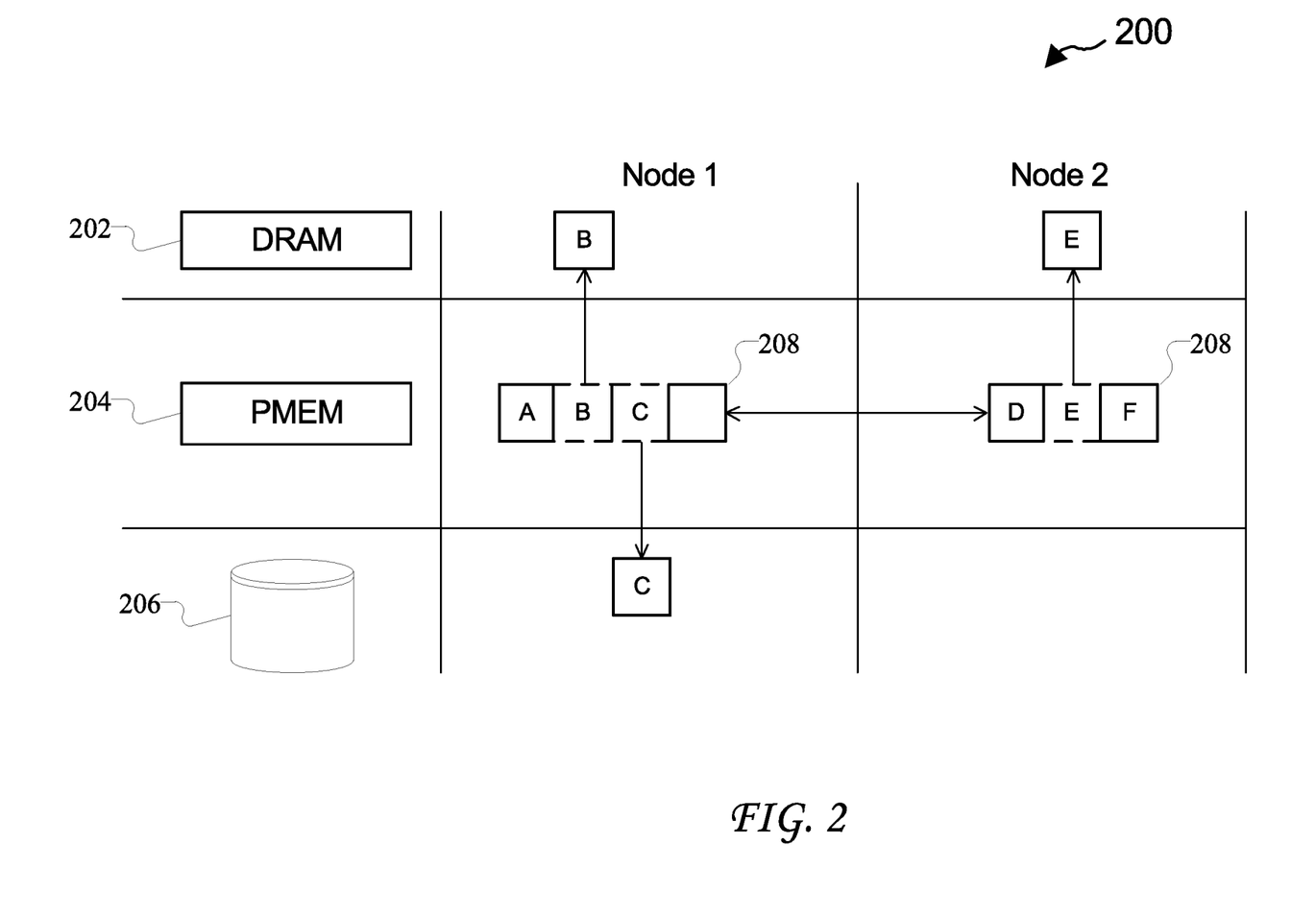
FIG. 2 conceptually illustrates an example of remote object retrieval performed using a remote direct memory access request between remote nodes, according to some aspects of the technology.

FIG. 2 conceptually illustrates an example environment 200 in which memory retrieval can be performed using a remote direct memory access (RDMA) request between distinct network nodes. Environment 200 illustrates two network nodes (Node 1 and Node 2), each of which are associated with a hierarchical memory structure having available DRAM 202, PMEM 204, and magnetic storage such as HDD 206. In this example, fields of object 208 are distributed between DRAM 202, PMEM 204, and HDD 206 structures on Node 1 and Node 2.

Memory retrieval costs can be calculated for each field of object 208 (e.g., fields A, B, C, D, E, and F. At Node 1, high cost fields, such as field A, are kept in PMEM 204, whereas lower cost fields are moved into other (more abundant or less expensive) memory structures, such as DRAM 202 and HDD 206. In this example, field B may be moved into DRAM 202 because it has a low re-computation cost factor and can be easily reconstructed, if not persisted. Field C may have a high re-computation cost factor, but is not frequently read, and so is a candidate for storage in HDD 206.

Due to memory constraints at Node 1, high cost fields of object 208 can be stored on memory structures associated with an altogether different node, e.g., Node 2. As illustrated, high cost fields D and F can be kept in PMEM 204, whereas field E may be determined to have a lower cost and is stored in DRAM 202, for example, to free additional PMEM resources on Node 2.

In some network configurations, it may be advantageous to keep objects/fields stored in remote PMEM structures, even if memory resources are available on other memory devices (e.g., DRAM/HDD) of a local memory hierarchy. Further to the above example, field D (having a high cost metric) can be advantageously stored in PMEM 204 at Node 2, as opposed to HDD 206 or DRAM 202 at either Node 1 or Node 2.

When data contained on Node 2 is needed at Node 1, a retrieval request from Node 1 can be transmitted to Node 2, specifying the location of the object/field being requested (e.g., by referencing a linked-list). In the example of FIG. 2, field D can be requested by Node 1, for example, using a byte-addressable request format, such as RDMA.

Figure 3:
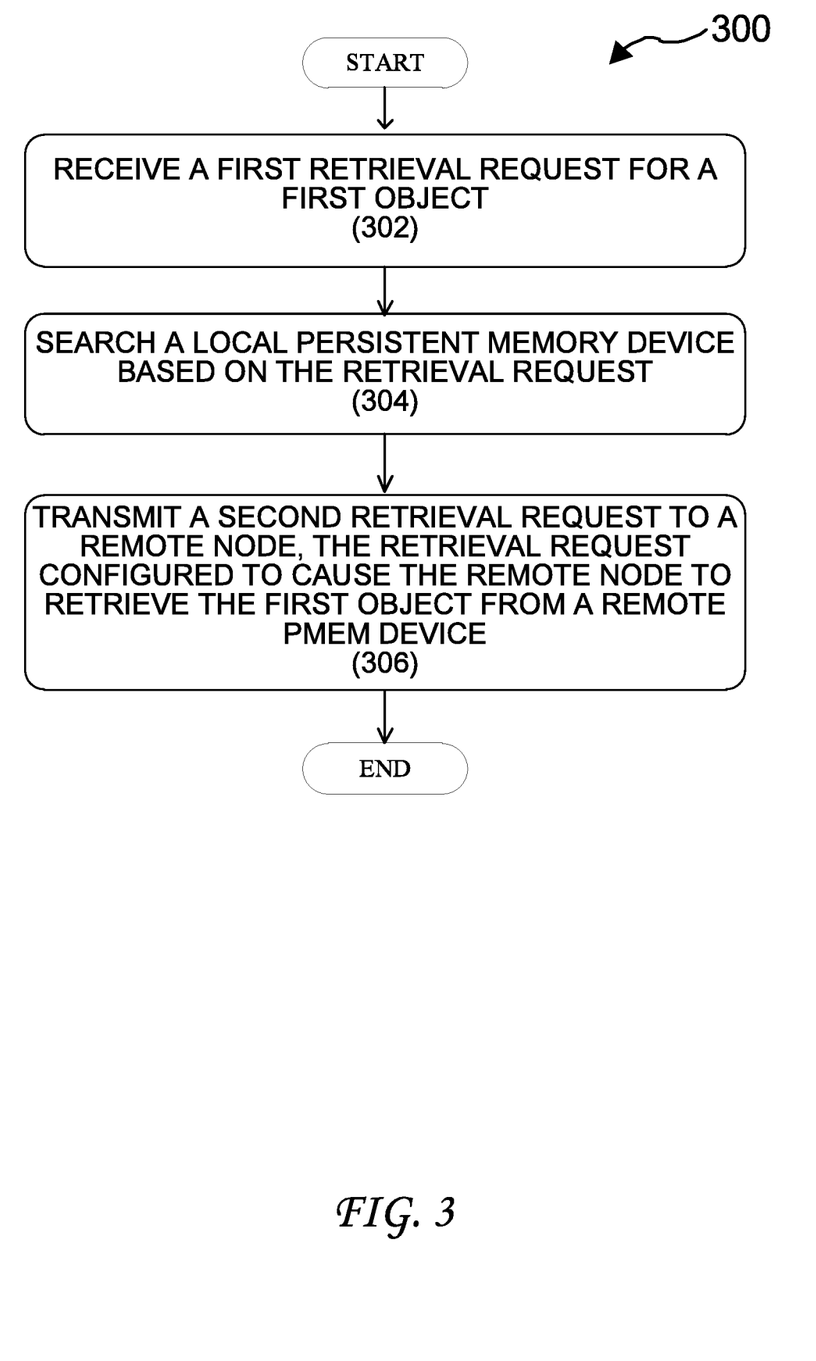
FIG. 3 illustrates an example process for performing a remote object retrieval, according to some aspects of the technology.

FIG. 3 illustrates an example object retrieval process 300 that can be implemented between two or more network nodes. Process 300 begins when a first retrieval request is received for a first object, e.g., at a first node (302). The first retrieval request can be received by the first node, for example, from a user or other network device that is requesting data associated with the first object. As discussed in further detail below, the first object can represent any type of data. By way of example, the object can refer to a particular instance of a class where the object can be a combination of variables, functions, and/or data structures, e.g., "fields."

In response to the first retrieval request, the first node can search one or more local memory structures to determine if the requested object is available in local memory (304). In some implementations, a hierarchical memory structure associated with the first node can include multiple memory types, such as, DRAM, PMEM, and a HDD. As such, upon receiving the first retrieval request, the first node can determine if the requested object is available in one of the local memory devices and in particular, if it is available in a local PMEM device. In some implementations, determining whether the first object is available in local memory of the first node can include referencing one or more linked-lists that can be used to identify a location of the requested data.

If it is determined that the requested object is available, for example, in local PMEM storage, the object can be returned in response to the first request. Alternatively, if the first node determines that the object is unavailable in a memory device local to the first node, a second retrieval request is generated by the first node and transmitted to one or more remote nodes where the requested data is stored (306). The second retrieval request can be configured to cause the receiving (second) node to retrieve the requested object from one or more memory devices, such as a PMEM device, that is (locally) associated with the second node. Node location and memory offset information can be included in the second retrieval request using one or more linked lists that identify storage location information for the requested data (first object).

The second retrieval request issued from the first node can be a RDMA request. As discussed above, RDMA memory requests can be used to take advantage of the byte-addressable nature of the PMEM device, i.e., without serialization and deserialization. That is, by using RDMA retrieval requests, the transfer of unnecessary or superfluous data over the network can be avoided.

In some approaches, the first object may be moved from a remote PMEM device associated with the second node to a local PMEM device associated with the first node. Determinations as to whether to move data from a remote PMEM device to a local PMEM device (e.g., from the second node to the first node), may be based on various factors, including but not limited to: a frequency of object access by the first node, an availability of PMEM resources at the first node, and/or an availability of PMEM resources at the second node.

By way of example, data may be transferred from a remote PMEM device (at a second node) to a local PMEM device (at a first node) if the object is frequently accessed by the first node (high cost) and there is sufficient space on the local PMEM device (high local memory resource availability) and/or if PMEM resources are limited on the remote PMEM device (low remote memory resource availability).

Decisions regarding whether to copy data from a remote node (remote memory) to a local node (local memory) can be based on a predetermined threshold for unallocated memory at the local device. For example, a predetermined threshold may be set such that data transfer is not performed unless a local PMEM device has at least 25% of a total memory resource that is unallocated. It is understood that other thresholds may be used, and that other factors can be used either alone, or in conjunction with, measures of unallocated memory when making data copy determinations. Additionally, it is understood that the memory retrieval features discussed above can be applied to virtually any type or amount of data, without departing from the scope the technology. For example, data requests from a first node may be made to a second node where the requested data comprises social profile information, for example, relating to social profile information for one or more users of a social network.

As used herein, social profile information can include any information or metadata relating to a user profile, for example, that is stored or made accessible by a social networking service. Non-limiting examples, of social profile information include user information such as: name, age, sex, location, interests. In some embodiments, social profile information may also include user generated or curated content, including images, text, video and/or status indicators, etc.

Figure 4:
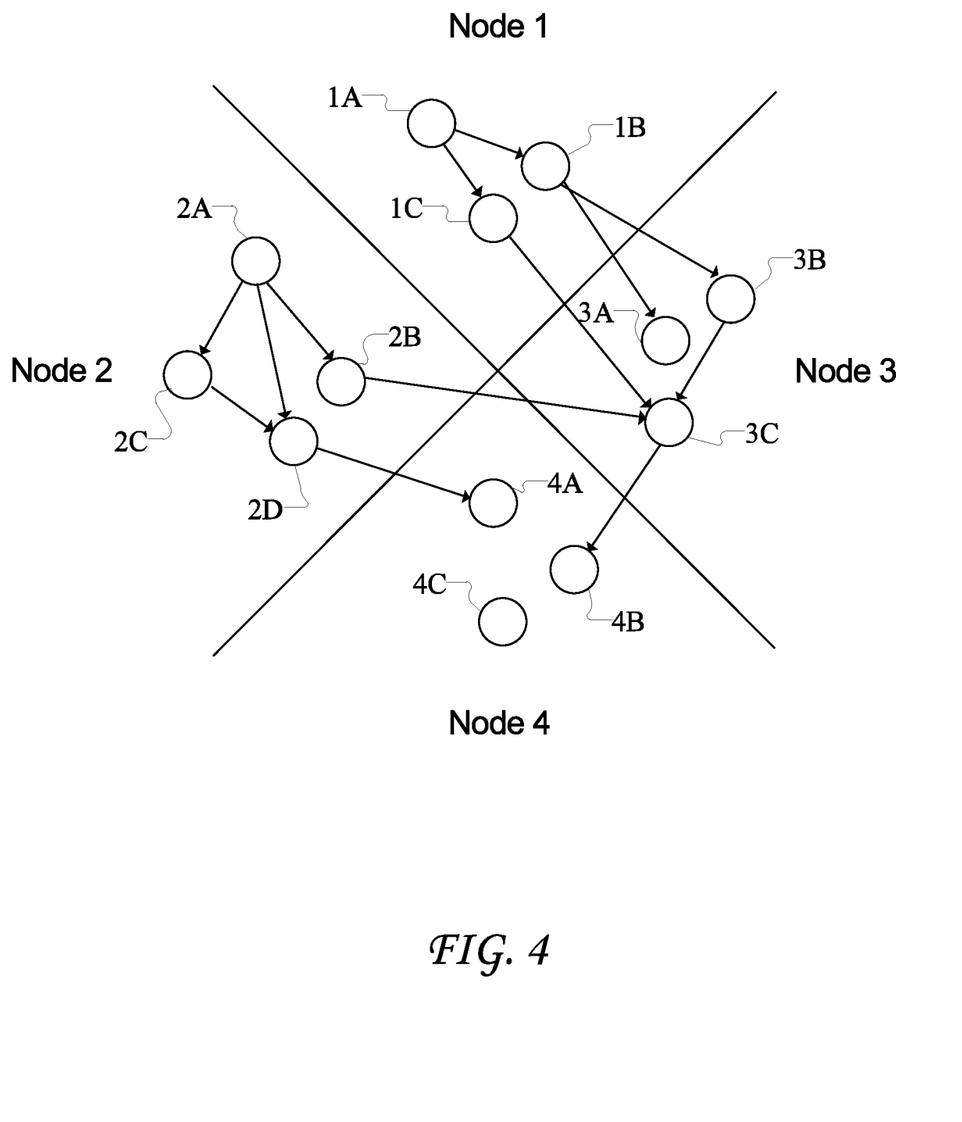
FIG. 4 conceptually illustrates a segmentation of data objects across different geographically located nodes, according to some aspects of the technology.

FIG. 4 conceptually illustrates an example segmentation of data objects across geographically disparate nodes. Each node contains a corresponding set of data (e.g., objects or object fields) that are grouped based on location, e.g., by node. In this example, each object can represent a social profile for a social network user, where frequently referential profiles are grouped (by node) to improve performance. As illustrated, profiles 1A, 1B, and 1C, are located at Node 1; profiles 2A, 2B, 2C, and 2D are located at Node 2, profiles 3A, 3B, and 3C are located at Node 3, and profiles 4A, 4B and 4C are located at Node 4. Profile groupings can be based on a frequency of access, for example, such that frequently referencing profiles are stored on a common node.

A data retrieval method of the disclosed technology can be implemented in a social network as illustrated in FIG. 4. By way of example, a user associated with profile 1B at Node 1, may frequently request data for profiles 3A and 3B, at Node 3. If the requested data is not found at Node 1, then a retrieval request may be issued from Node 1 to Node 3, requesting profile data for profiles 3A and 3B. Further to the examples discussed above, the retrieval request may be an RDMA request made to a byte-addressable PMEM device associated with Node 3. As such, profile data for the requested profiles (e.g. profile 3A and 3B), can be read from Node 3 in a byte-addressable manner, and transmitted over the network to Node 1.

Frequently accessed data (profiles) may be moved between PMEM devices in the network, for example, to reduce latency. For example, if profile 3A is more frequently accessed by profiles on Node 1 than by those associated with Node 3, then the data for profile 3A may be moved to Node 1, depending on resource availability.

In some implementations, data storage may be performed using memory types other than PMEM, e.g., DRAM or HDD. In such instances, retrieval requests may not benefit from byte-addressability, and latency times may suffer from the necessities of greater bandwidth consumption. By way of example, profile 4C may be stored in an HDD associated with Node 4. As such, retrieval requests received at Node 4, e.g., from any of Nodes 1-3, may cause data to be retrieved from HDD.

Figure 5:
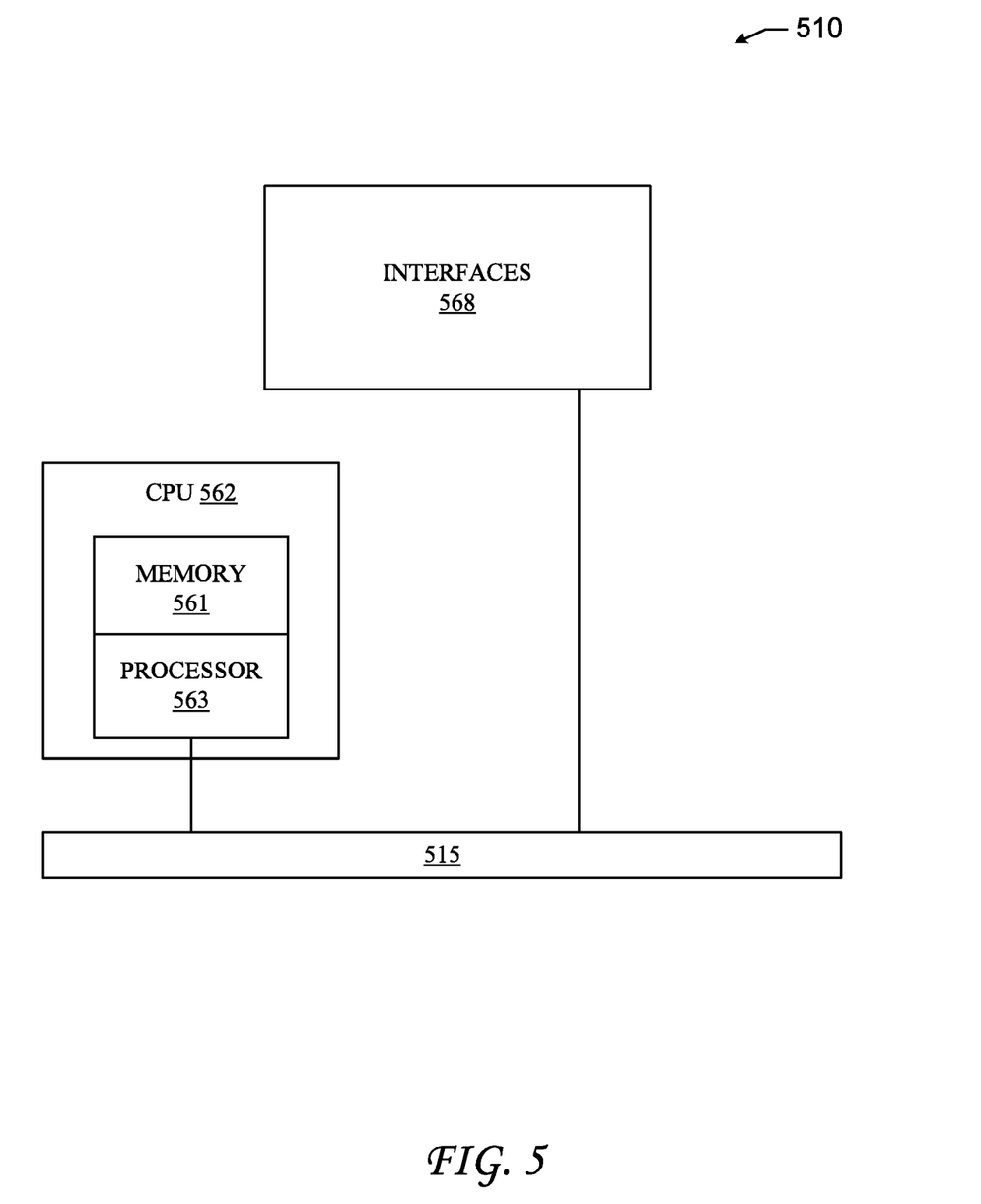
FIG. 5 illustrates an example computing device that may be used to implement some aspects of the technology.

FIG. 5 illustrates an example network device on which some aspects of the technology can be implemented. Network device 510 includes master central processing unit (CPU) 562, interfaces 568, and a bus 515 e.g., a Peripheral Computer Interconnect (PCI) bus. CPU 562 can include one or more processors 563, such as processors from the Intel, ARM, and/or Motorola family of microprocessors or the MIPS family of microprocessors. In an alternative embodiment, processor 563 is specially designed hardware for controlling the operations of network device 510. In a specific embodiment, a memory 561 (such as non-volatile RAM and/or ROM) also forms part of CPU 562. However, there are many different ways in which memory could be coupled to the system.

In some aspects, CPU 562 and/or processor 563 can be configured to execute instructions for retrieving data from a remote network node. In conjunction with the use of interfaces 568, memory 561, and bus 515, device 510 can be configured to implement steps for: receiving a first retrieval request for a first object, searching the local PMEM device for the first object based on the first retrieval request, and in response to a failure to find the first object on the local PMEM device, transmitting a second retrieval request to a remote node, wherein the second retrieval request is configured to cause the remote node to retrieve the first object from a remote PMEM device. In some approaches, device 510 may be further configured to perform operations including: receiving the first object from the remote node, determining if an unallocated capacity of the local PMEM device exceeds a predetermined threshold, and storing the first object to the local PMEM device if it is determined that the unallocated capacity of the local PMEM device exceeds the predetermined threshold.

Interfaces 568 can be provided as interface cards (sometimes referred to as "network interface cards" (NICs) or "line cards"). Generally, they control the sending and receiving of data packets over the network and sometimes support other peripherals used with device 510. Among the interfaces that may be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High Speed Serial Interfaces (HSSIs), Point of Sale (POS) interfaces, Fiber Distributed Data Interface (FDDIs), and the like. Generally, these interfaces can include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more non-transitory memories or memory modules (including memory 561) configured to store program instructions for general-purpose network operations and mechanisms necessary to implement one or more steps of a service chain auto-tuning process of the subject technology. For example, memory 561 can include a non-transitory computer-readable medium that includes instructions for causing CPU 562 to execute operations for determining a latency cost for each of a plurality of fields in an object, identifying at least one field, among the plurality of fields, having a latency cost that exceeds a predetermined threshold, determining whether to store the at least one field to a first memory device or a second memory device based on the latency cost. In some aspects, the operations can further include the above steps, wherein the latency cost for each of the fields in the object is based on an access frequency and a re-computation cost factor for the corresponding field. In some aspects, the operations can further include the above steps, wherein the latency cost for each of the fields in the object is based on an access cost factor and a latency for the corresponding field.

For clarity of explanation, the illustrative system embodiment is presented as including individual functional blocks including functional blocks labeled as a "processor" or processor 563. The functions these blocks represent may be provided through the use of either shared or dedicated hardware, including, but not limited to, hardware capable of executing software and hardware that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an "aspect" may refer to one or more aspects and vice versa. A phrase such as a "configuration" does not imply that such configuration is essential to the subject technology or that such configuration applies to all possible configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A system comprising:
   one or more processors;
   a network interface coupled to the processors, the network interface configured to transact data with a computer network;
   a local persistent memory (PMEM) device coupled to the one or more processors; and
   a computer-readable medium coupled to the processors, the computer-readable medium comprising instructions stored therein, which when executed by the processors, cause the processors to perform operations comprising:
      determining, based on a retrieval cost metric, whether to store an object in a local PMEM or a remote PMEM;
      storing the object in the local PMEM in response to the retrieval cost metric indicting that a retrieval cost for storing in the object in the local PMEM is lower than a retrieval cost for storing in the object in the remote PMEM;
      receiving a first retrieval request for a first object;
      searching the local PMEM device for the first object based on the first retrieval request;
      in response to a failure to find the first object on the local PMEM device, transmitting a second retrieval request to a remote node, wherein the second retrieval request is configured to cause the remote node to retrieve the first object from a remote PMEM device;
      receiving the first object from the remote node;

determining if an unallocated capacity of the local PMEM device exceeds a predetermined threshold; and storing the first object to the local PMEM device in response to determining that the unallocated capacity of the local PMEM device exceeds the predetermined threshold;

wherein the retrieval cost metric determines retrieval cost based on parameters including an access frequency of the object, a delay incurred when performing read/writes to a particular PMEM, PMEM latency, and latency incurred from re-computing data lost due to memory volatility.

2. The system of claim 1, wherein the second retrieval request is a remote direct memory access (RDMA) request.

3. The system of claim 1, wherein the second retrieval request specifies a memory offset used by the remote node to locate the first object in the remote PMEM device.

4. The system of claim 1, wherein searching the local PMEM device comprises searching a linked list.

5. The system of claim 1, wherein the second retrieval request is configured to cause the remote node to retrieve the first object from a hard-disk drive if the first object is unavailable on the remote PMEM device.

6. The system of claim 1, wherein the first object comprises social profile data.

7. A method for retrieving data from a persistent memory (PMEM) device, comprising:

determining, based on a retrieval cost metric, whether to store an object in a local PMEM or a remote PMEM;

storing the object in the local PMEM in response to the retrieval cost metric indicting that a retrieval cost for storing in the object in the local PMEM is lower than a retrieval cost for storing in the object in the remote PMEM;

receiving a first retrieval request for a first object;

searching the local PMEM device for the first object based on the first retrieval request;

in response to a failure to find the first object on the local PMEM device, transmitting a second retrieval request to a remote node, wherein the second retrieval request is configured to cause the remote node to retrieve the first object from the remote PMEM device;

receiving the first object from the remote node;

determining if an unallocated capacity of the local PMEM device exceeds a predetermined threshold; and storing the first object to the local PMEM device in response to determining that the unallocated capacity of the local PMEM device exceeds the predetermined threshold;

wherein the retrieval cost metric determines retrieval cost based on parameters including an access frequency of the object, a delay incurred when performing read/writes to a particular PMEM, PMEM latency, and latency incurred from re-computing data lost due to memory volatility.

8. The method of claim 7, wherein the second retrieval request is a remote direct memory access (RDMA) request.

9. The method of claim 7, wherein the second retrieval request specifies a memory offset used by the remote node to locate the first object in the remote PMEM device.

10. The method of claim 7, wherein searching the local PMEM device comprises searching a linked list.

11. The method of claim 7, wherein the second retrieval request is configured to cause the remote node to retrieve the first object from a hard-disk drive if the first object is unavailable on the remote PMEM device.

12. The method of claim 7, wherein the first object comprises social profile data.

13. A non-transitory computer-readable storage medium comprising instructions stored therein, which when executed by one or more processors, cause the processors to perform operations comprising:

determining, based on a retrieval cost metric, whether to store an object in a local PMEM or a remote PMEM;

storing the object in the local PMEM in response to the retrieval cost metric indicting that a retrieval cost for storing in the object in the local PMEM is lower than a retrieval cost for storing in the object in the remote PMEM;

receiving a first retrieval request for a first object;

searching a local PMEM device for the first object based on the first retrieval request;

in response to a failure to find the first object on the local PMEM device, transmitting a second retrieval request to a remote node, wherein the second retrieval request is configured to cause the remote node to retrieve the first object from a remote PMEM device;

receiving the first object from the remote node;

determining if an unallocated capacity of the local PMEM device exceeds a predetermined threshold; and storing the first object to the local PMEM device in response to determining that the unallocated capacity of the local PMEM device exceeds the predetermined threshold;

wherein the retrieval cost metric determines retrieval cost based on parameters including an access frequency of the object, a delay incurred when performing read/writes to a particular PMEM, PMEM latency, and latency incurred from re-computing data lost due to memory volatility.

14. The non-transitory computer-readable storage medium of claim 13, wherein the second retrieval request is a remote direct memory access (RDMA) request.

15. The non-transitory computer-readable storage medium of claim 13, wherein the second retrieval request specifies a memory offset used by the remote node to locate the first object in the remote PMEM device.

16. The non-transitory computer-readable storage medium of claim 13, wherein searching the local PMEM device comprises searching a linked list.

17. The non-transitory computer-readable storage medium of claim 13, wherein the second retrieval request is configured to cause the remote node to retrieve the first object from a hard-disk drive if the first object is unavailable on the remote PMEM device.

* * * * *